United States Patent [19]
Worrell

[11] 4,059,920
[45] Nov. 29, 1977

[54] HANGING FLOWER POT ARRANGEMENT

[76] Inventor: Paul O. Worrell, P.O. Box 347, Etowah, N.C. 28729

[21] Appl. No.: 663,560

[22] Filed: Mar. 3, 1976

[51] Int. Cl.² ............................................. A01G 9/02
[52] U.S. Cl. ......................................... 47/67; 47/71
[58] Field of Search ...................... 47/35, 34, 38, 38.1, 47/67, 71; 248/346.1, 346; 220/69; 215/100.5

[56] References Cited
U.S. PATENT DOCUMENTS

| 2,504,031 | 4/1950 | Manning | 47/34 |
| 2,605,588 | 8/1952 | Lindstaedt | 47/38 |
| 2,910,219 | 10/1959 | Bennett et al. | 348/346 |
| 3,943,661 | 3/1976 | DeVito et al. | 47/35 |
| 3,949,524 | 4/1976 | Mickelson | 47/34 |

Primary Examiner—Robert E. Bagwill
Attorney, Agent, or Firm—Bailey, Dority & Flint

[57] ABSTRACT

A hanging flower pot assembly is illustrated wherein a dish is positioned beneath a flower pot in spaced relation thereto so as to receive water which passes through the bottom of the flower pot thus providing drainage for the roots of plants within the flower pot avoiding excessive soaking thereof as may cause rotting. The dish may be positioned in spaced relation beneath the flower pot by providing spaced projections carrying camming means for passing through and engaging a central opening within the bottom of the flower pot, spaced protuberances being provided for maintaining the spacing between the dish and the flower pot.

1 Claim, 3 Drawing Figures

HANGING FLOWER POT ARRANGEMENT

BACKGROUND OF THE INVENTION

A variety of hanging flower pot arrangements have been provided in the past and some of them have included dishes to receive excess water positioned below the flower pot. Such an arrangement is illustrated in U.S. Pat. No. 1,648,570. However, the dishes of such devices have not been spaced from the flower pot, but on the contrary have been fastened directly in engagement therewith such as is illustrated in the patent.

Accordingly, it is an important object of the present invention to provide a hanging flower pot assembly wherein a dish may be readily positioned in spaced relation to the bottom of a flower pot to receive excess water therefrom to avoid excessive soaking of the roots of plants within the flower pot.

Another inportant object of the invention is to provide a versatile molded plastic flower pot arrangement which may be shipped and packaged in pieces and readily asssembled by the user.

Another important object of the invention is to provide a plastic flower pot assembly which will be attractive, inexpensive, easily assembled and particularly conducive to the growth of healthy plants in hanging arrangements.

BRIEF DESCRIPTION OF THE INVENTION

It has been found that a hanging flower pot arrangement may be constructed wherein a dish is spaced beneath the flower pot by providing circumferentially spaced flexible projections extending upwardly from the dish to be received within an opening within the flower pot and spaced protuberances provided for maintaining the dish in properly spaced relation below the flower pot so that the dish may receive water for avoiding injury to the root system of the plants contained within the flower pot.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
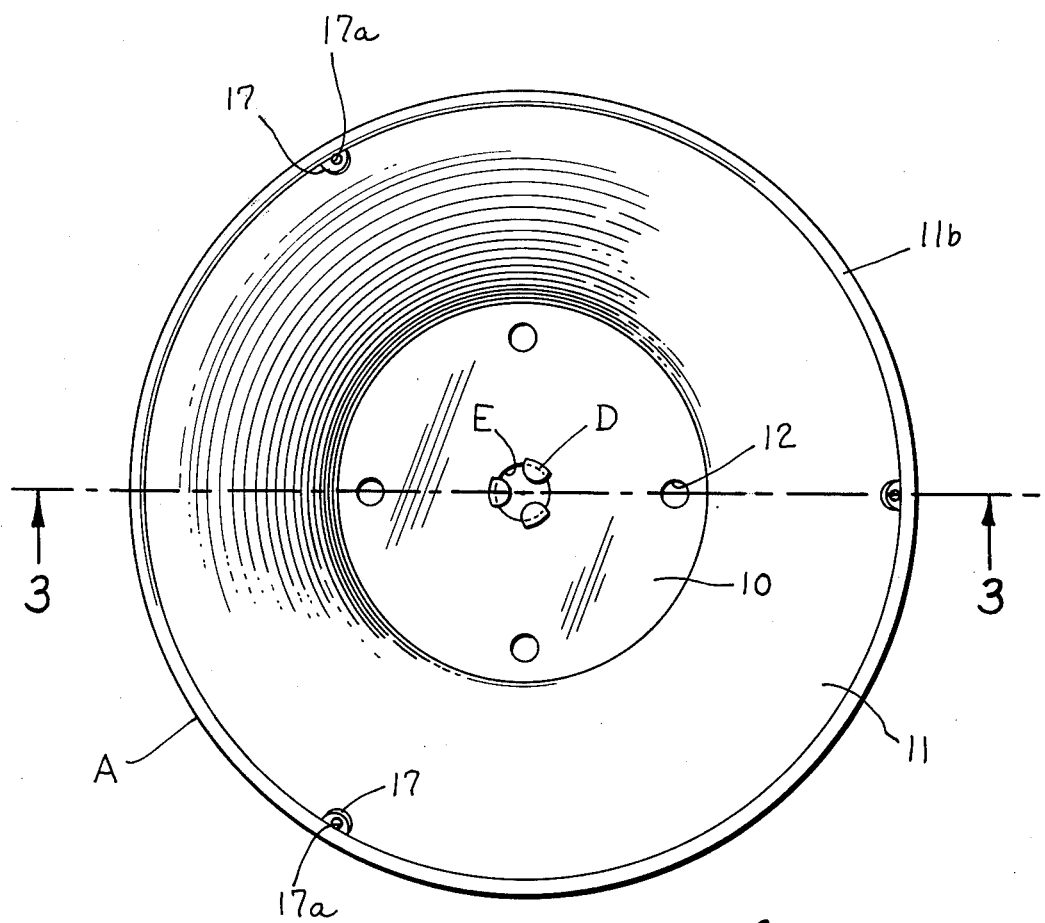
FIG. 1 is a top plan view illustrating a hanging flower pot assembly constructed in accordance with the present invention.
Figure 2:
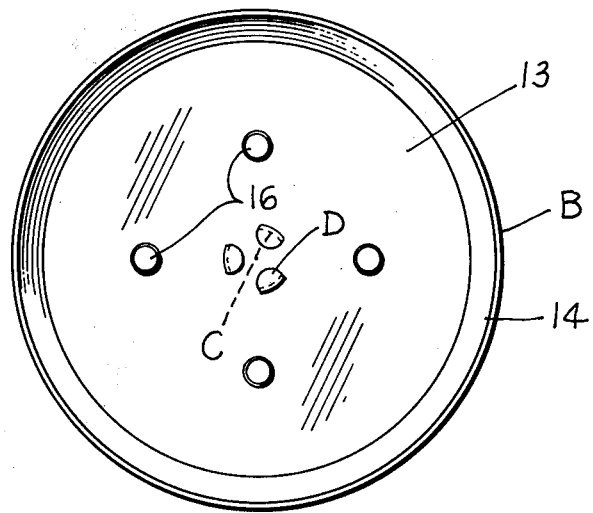
FIG. 2 is a top plan view illustrating the dish of the assembly illustrated in FIG. 1, the flower pot being removed.

The drawings illustrate a hanging flower pot assembly including: a flower pot A for containing the roots of a plant having a bottom, and a surrounding side wall extending upwardly from a marginal portion of the bottom. A dish B is carried below the bottom having a base and an upwardly extending flange carried by the base extending upwardly adjacent the bottom. A plurality of circumferentially spaced flexible projections C extend upwardly from a medial portion of the base. Enlarged inwardly converging cam follower portions D are carried by the projections and have outwardly extending portions projecting beyond the projections carried adjacent an upper portion thereof in spaced relation to the base. A camming portion E defines an opening in the medial portion of the bottom for urging the cam follower portions inwardly so as to be received therein and for suspending the base in spaced relation to the bottom. Means F are carried by said flower pot for suspending the entire assembly forming a hanging arrangement. Thus, water may flow from the bottom of the flower pot into the dish providing drainage for the roots avoiding excessive soaking thereof as may cause rotting.

The flower pot A includes a bottom 10 and surrounding side walls 11. The bottom 10 has circumferentially spaced openings 12 therein to permit excessive water to flow therethrough. Were it not for the dished portion B, one would be limited as to the extent of watering which could be done because excessive water would simply pour through the openings 12 and drip onto the floor. If the base of the dish is positioned adjacent the bottom of the flower pot, the dish retains excess water maintaining a level of water within the flower pot as may rot the roots. It is important, therefore, that the base of the dish be spaced a substantial distance below the bottom of the flower pot and that such spacing be positively maintained. The side walls 11 extend upwardly from a marginal portion of the bottom 10 curving outwardly at a progressively greater degree toward the top producing a flange 11a having a surrounding bead 11b. The flower pot and the dish, together with associated parts are preferably molded from a plastic having some flexibility and resiliency but which are capable of maintaining sufficient rigidity for the purpose of functioning as a flower pot and functioning together for the purposes described herein.

The dish B includes a base 13 together with an upwardly extending flange or wall 14 extending upwardly to a level adjacent the base of the flower pot to prevent a water level from being maintained within the flower pot. Grossly excessive amounts of water would simply flow over the wall 14. A plurality of circumferentially spaced flexible projections C are illustrated as being centrally located within the dish. The upward projections C carry inwardly converging cam follower portions D. These portions D are enlarged and extend outwardly having outwardly extending tip 15 for engaging a camming surface E defined by a central opening in the bottom 10 of the flower pot A. The base 13 of the dish B also carries upwardly projecting protuberances 16 in the central portion of the dish B which act as spacing members so that the bottom 10 will be confined between the projecting portion of the camming member D and an upper surface of the upwardly extending protuberances 16. It would be understood that the protuberances, and perhaps other parts hereof may be carried by the bottom 10 and extend downwardly rather than by the base of the dish extending upwardly.

Means F are provided for suspending the entire assembly include spaced tabs 17 containing openings 17a for receiving spaced wires 18 which extend downwardly through the openings 17a and are bent upwardly as illustrated at 18a in broken lines. The wires may be suitably fastened as by a hook fastened at a converging upward portion thereof, or otherwise fastened to a bracket or suitable member from which the entire assembly is suspended.

Figure 3:
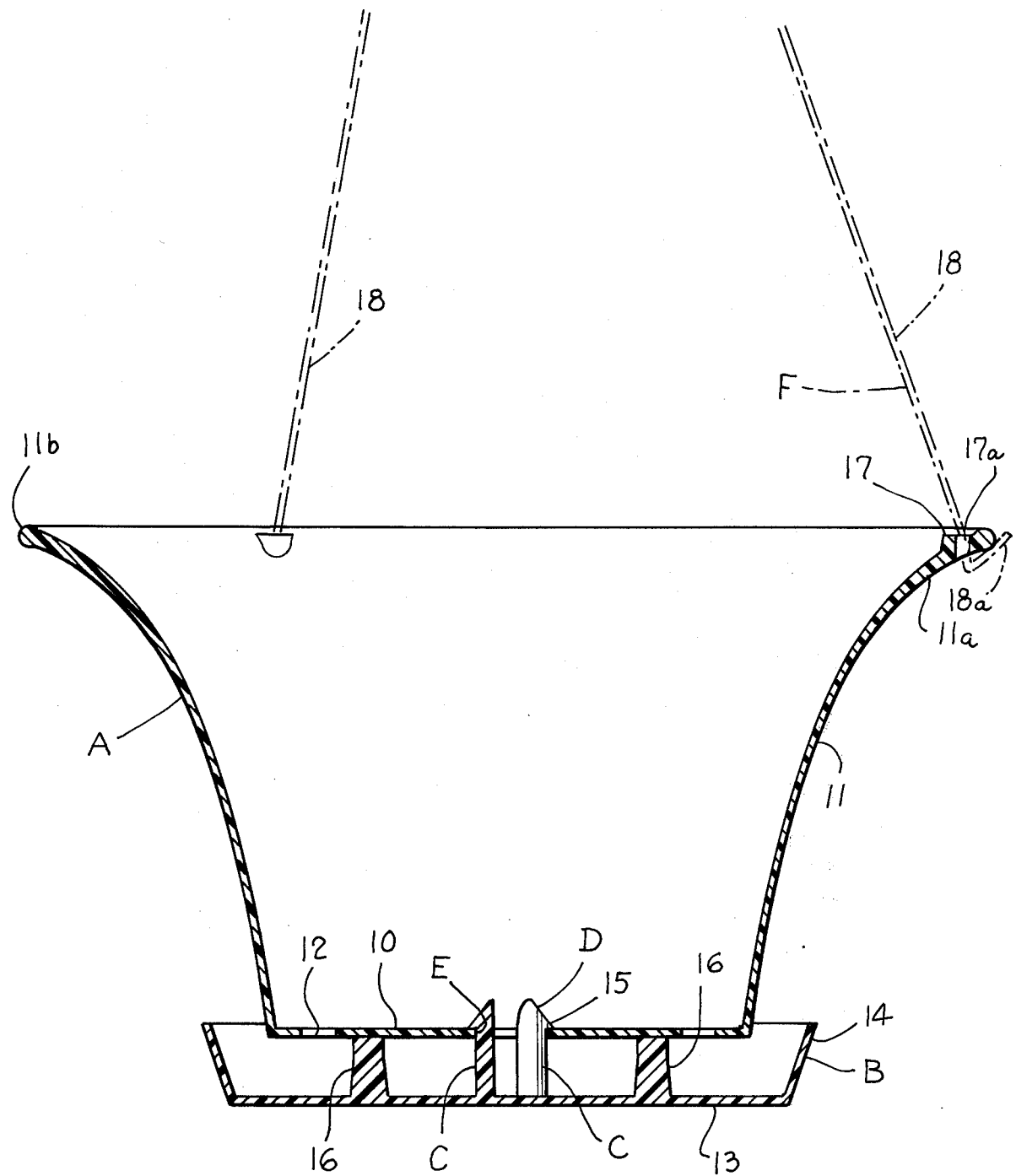
FIG. 3 is an enlarged transverse sectional elevation taken on the line 3—3 of FIG. 1.

It will be observed that the user may receive the flower pot assembly packaged so that the dish is contained within the flower pot and the arrangement may be readily assembled by the purchaser by simply pressing the camming surfaces D against the camming portion E flexing the projections C inwardly adjacent the top. After the outwardly projecting portions 15 are received within the opening defined by the camming surface E, they will snap in place so that the projections overlie the bottom 10 of the flower pot as is best illustrated in FIG. 3. The upwardly extending projections 16 insure proper spacing of the dish beneath the bottom. Thus, the dish is held in assembly with the flower pot throughout the period of use. Even in indoor hanging flower pot arrangements, the user may water the plant without fear of excessive water dripping on the floor damaging carpets and the surface of the floor. Additional openings may be provided in the bottom of the flower pot to insure effective drainage and by positioning the dish beneath the bottom of the flower pot, adequate drainage is assured. Makeshift arrangements, such as the placing of the flower pot in a pie pan or other dish is avoided. Such makeshift arrangements have not been effective because there was no spaced dish within which water could be received without soaking the roots.

While a preferred embodiment of the invention has been described using specific terms, such description is for illustrative purposes only, and it is to be understood that changes and variations may be made without departing from the spirit or scope of the following claims.

What is claimed is:

1. A hanging flower pot assembly comprising:
   A. a flower pot for containing the roots of a plant having a bottom, and a surrounding side wall extending upwardly from a marginal portion of said bottom;
   B. a dish carried below said bottom having a base and an upwardly extending flange carried by said base extending upwardly with an upper edge terminating substantially coplanar with said bottom;
   C. a plurality of circumferentially spaced, flexible projections extending upwardly from a medial portion of said base;
   D. enlarged inwardly converging cam follower portions carried by said projections having outwardly extending portions projecting beyond said projections carried adjacent an upper portion thereof in spaced relation to said base;
   E. a camming portion defining an opening in the medial portion of said bottom for urging said cam follower portions inwardly so as to be received therein;
   F. said outwardly extending portions having a substantially flat lower surface which rests on the bottom of said pot for supporting said dish;
   G. means carried by said flower pot for suspending the entire assembly forming a hanging arrangement; and
   H. a plurality of circumferentially spaced protuberances extending upwardly from said base toward said bottom when said dish is suspended from said pot, said protuberances substantially surrounding said projections and extending at least half the distance from said projections to the periphery of said bottom and further comprising a plurality of drain holes in said bottom positioned radially beyond said protuberances to facilitate the drainage and aeration of said soil when the water level is therebelow;
   whereby water may flow from the the bottom of the flower pot into said dish providing drainage for the roots avoiding excessive soaking thereof as may cause rotting.

* * * * *